(12) United States Patent
Tucker et al.

(10) Patent No.: US 9,351,102 B2
(45) Date of Patent: May 24, 2016

(54) ACCESSING A VEHICLE USING PORTABLE DEVICES

(71) Applicant: Apple Inc., Cupertino, CA (US)

(72) Inventors: Brian J. Tucker, San Jose, CA (US); Emily C. Schubert, San Jose, CA (US); Jesse L. Dorogusker, Palo Alto, CA (US); Joakim Linde, Palo Alto, CA (US); Stephen Chick, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/612,182

(22) Filed: Feb. 2, 2015

(65) Prior Publication Data

US 2015/0147974 A1    May 28, 2015

Related U.S. Application Data

(63) Continuation of application No. 13/278,027, filed on Oct. 20, 2011, now Pat. No. 8,947,202.

(51) Int. Cl.
| | |
|---|---|
| *G05B 19/00* | (2006.01) |
| *B60R 25/10* | (2013.01) |
| *H04Q 1/00* | (2006.01) |
| *H04W 4/00* | (2009.01) |
| *G07C 9/00* | (2006.01) |
| *H04L 9/08* | (2006.01) |
| *H04M 1/725* | (2006.01) |
| *H04W 76/02* | (2009.01) |
| *H04W 12/04* | (2009.01) |
| *H04L 29/06* | (2006.01) |

(52) U.S. Cl.
CPC ........... *H04W 4/008* (2013.01); *G07C 9/00309* (2013.01); *H04L 9/08* (2013.01); *H04M 1/7253* (2013.01); *H04W 12/04* (2013.01); *H04W 76/023* (2013.01); *G07C 2209/04* (2013.01); *H04L 63/061* (2013.01)

(58) Field of Classification Search
CPC ........................................................ G05B 19/00
USPC ......................................................... 340/5.61
See application file for complete search history.

(56) References Cited

U.S. PATENT DOCUMENTS

| | | | |
|---|---|---|---|
| 7,146,129 B2 | 12/2006 | Bostrom | |
| 7,672,666 B2 | 3/2010 | Hasan | |
| 7,821,383 B2 * | 10/2010 | Sultan | G07C 5/008 340/425.5 |
| 7,928,829 B2 * | 4/2011 | Hermann | B60R 25/24 340/5.2 |
| 2011/0119734 A1 | 5/2011 | Crawford | |
| 2012/0075059 A1 * | 3/2012 | Fyke | G06F 21/35 340/5.21 |

OTHER PUBLICATIONS

"SMS warms up your car," http://textually.org/textually/archives/2002/02/019130.htm, Feb. 19, 2009, 1 Page.

* cited by examiner

*Primary Examiner* — Jennifer Mehmood
*Assistant Examiner* — John Mortell
(74) *Attorney, Agent, or Firm* — Michael H. Lyons

(57) ABSTRACT

A primary portable device can access a vehicle by transmitting an activation message including a vehicle access credential to the vehicle. The primary portable device can additionally enable a secondary portable device to access the vehicle by transmitting the vehicle access credential to the secondary portable device. The connections between the primary portable device, secondary portable device, and vehicle can be based on a short-range wireless protocol, such as Bluetooth or Bluetooth LE.

20 Claims, 10 Drawing Sheets

ACCESSING A VEHICLE USING PORTABLE DEVICES

This application is a continuation of U.S. patent application Ser. No. 13/278,027 filed Oct. 20, 2011, which is hereby incorporated herein in its entirety. This application claims the benefit of and claims priority to U.S. patent application Ser. No. 13/278,027, filed Oct. 20, 2011.

BACKGROUND

The present disclosure relates generally to wireless communication between computing devices and more particularly to using portable computing devices to access a vehicle.

Computing devices have been in use for several decades. Examples of computing devices include, for example, desktop computers, laptop computers, mobile phones, smartphones, tablet devices, portable multimedia players, devices integrated into automobiles, and/or the like. Computing devices can be used for performing a wide variety of tasks, from the simple to the most complex. In some instances, computing devices can have weight and size characteristics such that the devices are portable or easily moved.

Many computing devices currently incorporate interfaces that support various wireless communication standards. For example, many interfaces currently support communications based on the Bluetooth protocol. The Bluetooth protocol, in general, enables point-to-point wireless communications between multiple devices over short distances (e.g., 30 meters). Bluetooth has gained widespread popularity since its introduction and is currently used in a range of different devices.

In order to allow Bluetooth to be used in a greater variety of applications, a low energy variant of the technology was introduced in the Bluetooth Core Specification, Version 4.0. Bluetooth Low Energy (LE), in general, enables devices to wirelessly communicate while drawing low amounts of power. For example, devices using Bluetooth LE can often operate for more than a year without requiring their batteries to be recharged.

BRIEF SUMMARY

According to various embodiments of the present invention, a portable device can be used to enable access to a vehicle. The portable device can additionally configure other portable devices to enable access to the same vehicle. In certain embodiments, communications between the portable devices and the vehicle can be based on one or more wireless connections, such as Bluetooth and/or Bluetooth LE connections.

For example, a first portable device (designated herein as the "primary" portable device) can receive a vehicle access credential from a vehicle over a wireless connection (e.g., a Bluetooth or Bluetooth LE connection). The primary portable device can thereafter use the vehicle access credential to wirelessly activate the vehicle such that one or more of the vehicle's operations can be accessed. Illustratively, upon activating a vehicle, a user of the primary portable device can interact with the vehicle to perform certain vehicle-related operations such as unlocking the vehicle's door, starting the vehicle's engine, etc. In some embodiments, the primary portable device can additionally transmit the vehicle access credential to a second portable device (designated herein as the "secondary" portable device) over a wireless connection (e.g., a Bluetooth or Bluetooth LE connection, a Wi-Fi network, or a cellular data network). Thereafter, the secondary portable device can use the credential to activate the same vehicle such that one or more of the vehicle's operations can be accessed. In certain embodiments, the primary portable device can place limitations or restrictions on the secondary portable device. For example, the primary portable device can limit the types of vehicle-related operations that are accessible when a vehicle is activated by the secondary portable device.

In some embodiments, a vehicle can only be operated so long as an activating portable device is present. For example, a vehicle can be configured such that its engine cannot be started unless a portable device with an appropriate vehicle access credential is detected. In this way, an activating portable device can act as the security point for the vehicle.

These and other embodiments of the invention along with many of its advantages and features are described in more detail in conjunction with the text below and attached figures.

DETAILED DESCRIPTION

Figure 1:
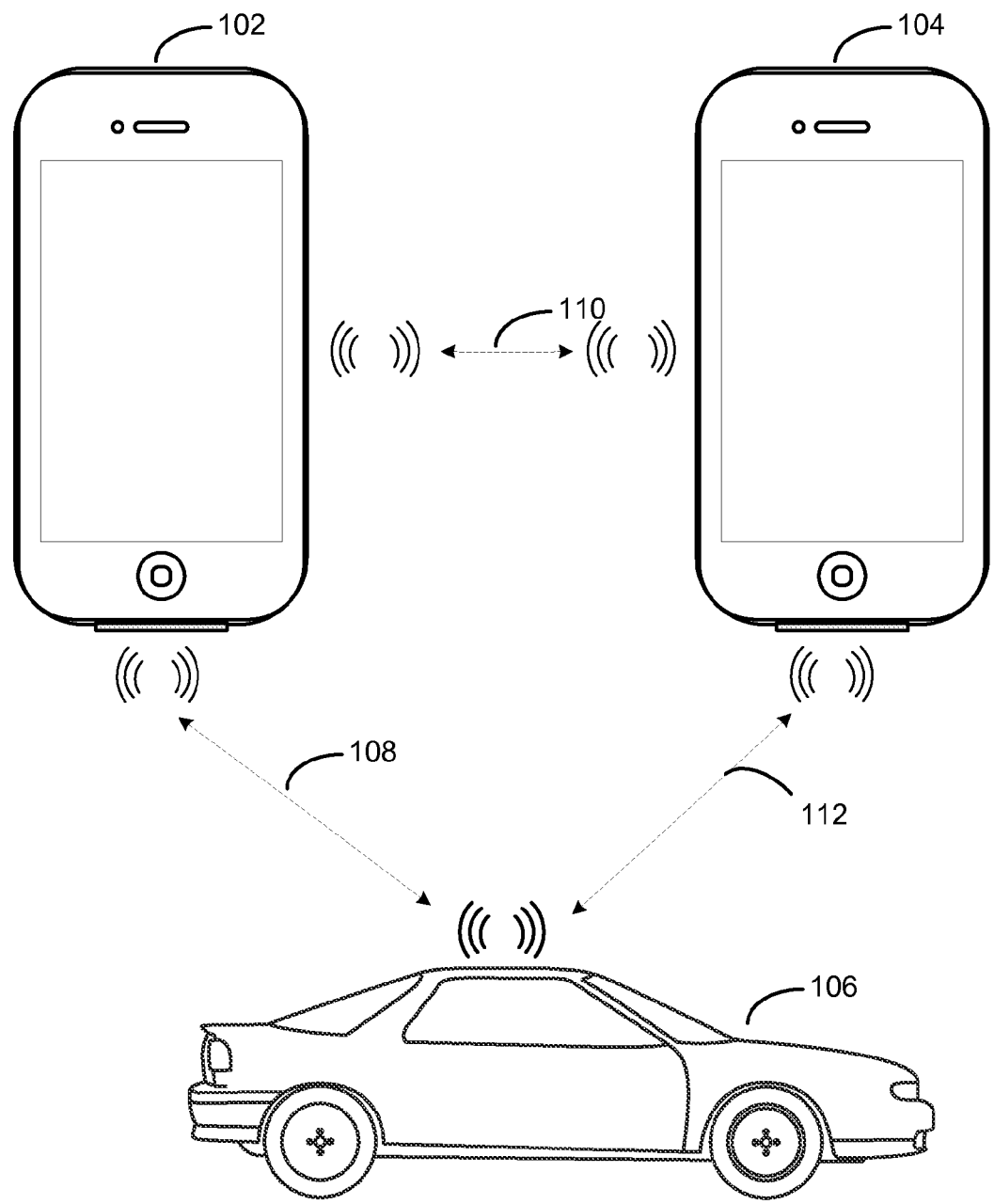
FIG. 1 illustrates a system including a primary portable device, a secondary portable device, and a vehicle according to an embodiment of the present invention.

Some embodiments of the present invention provide techniques for enabling a primary portable device to activate or enable a vehicle such that a user can access the operations of the vehicle. Certain embodiments additionally permit the primary portable device to enable a secondary portable device to similarly activate the vehicle. According to some embodiments, communications between the portable devices and the vehicle can be based on one or more wireless connections (e.g., Bluetooth or Bluetooth LE connections).

As used herein, a primary portable device can be a portable device that is configured to activate a vehicle through performing a vehicle setup procedure directly with the vehicle. A secondary portable device can be a portable device that is configured to activate a vehicle by a primary portable device.

Illustratively, a primary portable device can perform a setup procedure with a vehicle over a wireless connection (e.g., a Bluetooth or Bluetooth LE connection). During the setup procedure, the primary portable device can obtain a vehicle access credential from the vehicle. The primary portable device can later include the vehicle access credential in an activation message that is transmitted to the vehicle. The vehicle can validate the received access credential to determine whether the primary portable device is authorized to activate the vehicle such that the vehicle's operations can be accessed.

The primary portable device can additionally transmit the vehicle access credential to a secondary portable device over a wireless connection (e.g., a Bluetooth or Bluetooth LE connection, a Wi-Fi network, or a cellular data network). After receiving the access credential, the secondary portable device can use the access credential to similarly activate the vehicle. In certain embodiments, the primary portable device can further transmit usage information or parameters to the secondary portable device. The usage parameters can limit or restrict the manner in which a vehicle's operations can be accessed when a secondary portable device has been used to activate the vehicle. For example, the usage parameters can limit the accessibility of a vehicle's operations to a certain period of time (e.g., one hour from transmission of the vehicle access credential, between the times of 1 pm and 3 pm, etc.).

In some embodiments, a vehicle can only be operated so long as an activating portable device is present. For example, a vehicle can be configured such that its engine cannot be started unless a portable device with an appropriate vehicle access credential is detected or connected to the vehicle. In this way, an activating portable device can act as the security point for the vehicle.

As used herein, a vehicle access credential can be any value, data, or information suitable for determining whether a device is authorized to activate a vehicle. For example, a vehicle access credential can be or include one or more access tokens, access keys, access codes, access information, cryptographic keys, data signed using cryptographic keys, and/or the like.

As used herein, a vehicle-related operation can be any operation supported by a vehicle. For example, a vehicle-related operation can be an operation to unlock a vehicle's doors, unlock a vehicle's storage compartment, start a vehicle's engine, activate a vehicle's audio or audiovisual entertainment system, activate a vehicle's global positioning system (GPS), activate a vehicle's dashboard console, turn on a vehicle's passenger compartment lights, adjust a vehicle's seats, turn on a vehicle's headlights, open a vehicle's sun roof, turn on a vehicle's windshield wipers, activate a vehicle's automatic parking system, activate a vehicle's wireless communication system, and/or the like. In some embodiments, the vehicle-related operation can include a personalization operation, in which the vehicle automatically adjusts an environmental setting (e.g., seat position, mirror position, temperature controls, settings for an audio or audiovisual entertainment system) based on the received vehicle access credential and/or on the particular portable device from which the vehicle access credential is received.

As discussed, various entities (e.g., portable devices, vehicles) described herein can communicate over one or more wireless connections. Currently, many wireless communication standards exist for enabling different devices to communicate. One popular wireless communication standard, as noted, is Bluetooth. In general, Bluetooth allows voice and data communication between various devices without a physical cable, and instead uses frequency-hopping spread spectrum technology. Currently, Bluetooth exists in two variations: standard Bluetooth (e.g., Bluetooth Basic Rate/Enhanced Data Rate) and Bluetooth Low Energy (LE).

As a general matter, Bluetooth LE operates similarly to standard Bluetooth, except that those interfaces using Bluetooth LE consume less power and operate with lower latency. Bluetooth LE, in addition, uses a different a set of channels from standard Bluetooth. In particular, Bluetooth LE operates over 40 two-MHz-wide channels rather than the 79 one-Mhz-wide channels used in standard Bluetooth. While Bluetooth and Bluetooth LE are not designed to be compatible with one another, many Bluetooth interfaces support both variations (e.g., the modules can operate in dual mode).

At the most basic level, devices supporting Bluetooth and/or Bluetooth LE can establish wireless connections with neighboring Bluetooth and/or Bluetooth LE devices using point-to-point connections. In particular, a master-slave structure can be established where one master device communicates with at least one slave device in a network group called a piconet.

Typically, in order for two Bluetooth devices to establish a connection, the devices must be paired through a connection procedure. The connection procedure is frequently triggered automatically the first time a device receives a connection request from a device with which it is not yet paired. Initial pairing may require user intervention, e.g., to confirm that pairing is desired or to enter an authentication code. After a pairing has been established, parameters associated with the pairing can be remembered (e.g., stored) by the devices and a secure connection can be established. Following pairing, the paired devices can reconnect to each other without user intervention. If desired, the pairing relationship can later be removed by a user.

The following description primarily refers to communication using Bluetooth and/or Bluetooth LE connections. However, one skilled in the art will appreciate that the techniques disclosed in this specification are equally applicable to other types of connections, such as wired and other types of wireless connections (e.g., near field communications, WiFi, or the like).

In some instances, the following description discusses exchanging the same data (e.g., the same vehicle access credential) among various entities. However, it should be understood that data is considered the same insofar as the data has the same value, binary representation, etc. rather than being of the same physical embodiment. For example, a vehicle can transmit an access credential to a primary portable device. The primary portable device can thereafter transmit the same access credential to a secondary portable device. In the context of the description, the transmissions among the entities might not each include the same physical embodiment of the access credential. Rather, the transmissions among the entities can each include an access credential having the same value, binary representation, etc.

Referring to FIG. 1, a system 100 including a primary portable device 102, a secondary portable device 104, and a vehicle 106 is illustrated. Each of primary portable device 102, secondary portable device 104, and vehicle 106 can include wireless communication interfaces, such as a Bluetooth module, and various other components, examples of which are described in detail below.

Portable devices 102 and 104 can each be any portable device with a wireless interface, such as a laptop computer, a tablet device, a key fob, a car key, an access card, a multi-function device, a mobile phone, a portable gaming device, a portable multimedia player, a portable music player, a personal digital assistant (PDA), a household device, and/or any portable or non-portable electronic or electro-mechanical device and/or the like. For example, portable devices 102 and 104 can each be an iPod®, iPhone®, or iPad® device available from Apple Inc. of Cupertino, Calif.

Vehicle 106 can be any suitable transportation machinery, such as an automobile, a truck, a bus, a train, a tractor, a golf cart, a go-kart, a motorcycle, a scooter, a motorized bicycle, a boat, a watercraft (e.g., a jet-ski), an aircraft, a lawn mower, a snowmobile, a remote controlled device (e.g., remote controlled car or airplane), and/or the like. Further, it will be appreciated that the present invention is not limited to controlling access to a vehicle. In some embodiments, portable devices can be used to control access to any secured device (including relatively immobile devices such as safes or bank vaults) or secured area (e.g., a building, storage facility, or the like).

As shown in FIG. 1, primary portable device 102 and vehicle 106 can communicate via wireless connection 108. Additionally, primary portable device 102 and secondary portable device 104 can communicate via wireless connection 110. Furthermore, secondary portable device 104 and vehicle 106 can communicate via wireless connection 112. Each of the wireless connections 108, 110, and 112 can be a suitable wireless connection type, such as a Bluetooth LE or Bluetooth connection.

In some embodiments, primary portable device 102, secondary portable device 104, and vehicle 106 can exchange various information over the aforementioned wireless connections in order to enable the portable devices to activate or enable access to vehicle 106, as will be described in greater detail below.

It should be appreciated that the wireless connections shown in FIG. 1 can be, but need not be, concurrent. Illustratively, connection 108 between primary portable device 102 and vehicle 106 can be established at a first time. The connection can thereafter be terminated. At a later time, connection 110 between primary portable device 102 and secondary portable device 104 can be established, and also subsequently terminated. Following termination of connection 110, connection 112 between secondary portable device 104 and vehicle 106 can be established.

It will be further appreciated that the devices shown in FIG. 1 are illustrative and that variations and modifications are possible. For example, although the system of FIG. 1 only shows one primary portable device, one secondary portable device, and one vehicle, any suitable number of these entities (including zero) can be included. For example, system 100 can include two secondary portable devices that can communicate with primary portable device 102 and vehicle 106 over wireless connections.

Figure 2:
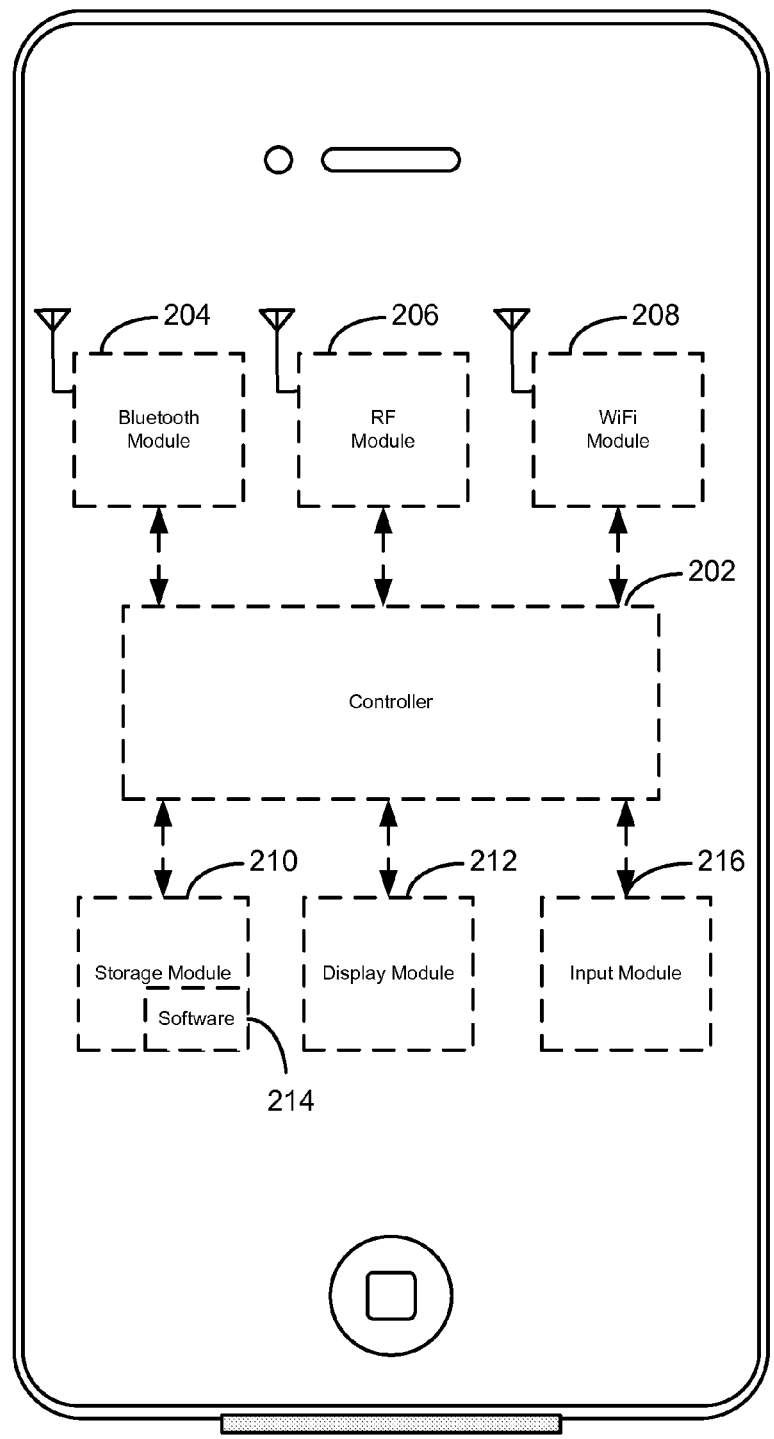
FIG. 2 illustrates an exemplary portable device according to an embodiment of the present invention.

FIG. 2 is a block diagram showing an exemplary portable device (e.g., primary and secondary portable devices 102 and 104 of FIG. 1) according to an embodiment. Portable device 200 can include a controller 202, a Bluetooth module 204, an RF module 206, a WiFi module 208, a storage module 210, a display module 212, and an input module 216. In some embodiments, portable device 200 can include additional modules, such as global positioning system (GPS) modules, battery modules, motion detection modules, device orientation modules, magnetometer modules, three-dimensional gyroscope modules, connector modules, audio modules, three-dimensional video processing modules, acceleration detection modules, camera modules, and/or the like. In some embodiments, portable device 200 can be a sufficient size, dimension, and weight to enable the device to be easily moved by a user. For example, portable device 200 can be pocket size.

Controller 202, which can be implemented as one or more integrated circuits, can control and manage the overall operation of portable device 200. For example, controller 202 can perform various tasks, such as retrieving various assets that can be stored in storage module 210, accessing the functionalities of various modules (e.g., interacting with other Bluetooth enabled devices via Bluetooth module 204), executing various software programs (e.g., operating systems and applications) residing on storage module 210, generating vehicle activation messages, receiving vehicle access credentials, and so on. In some embodiments, controller 202 can include one or more processors (e.g., microprocessors or microcontrollers) configured to execute machine-readable instructions. For example, controller 202 can include a single chip applications processor. Controller 202 can further be connected to storage module 210 in any suitable manner.

Bluetooth module 204 can include any suitable combinations of hardware for performing wireless communications with other Bluetooth enabled devices and allows an RF signal to be exchanged between controller 202 and other Bluetooth enabled devices. In some embodiments, Bluetooth module 204 can perform such wireless communications according to Bluetooth Basic Rate/Enhanced Data Rate (BR/EDR) and/or Bluetooth Low Energy (LE) standards. For example, Bluetooth module 204 can include suitable hardware for performing device discovery, connection establishment, and communication based on only Bluetooth LE (e.g., single mode operation). As another example, Bluetooth module 204 can include suitable hardware for device discovery, connection establishment, and communication based on both Bluetooth BR/EDR and Bluetooth LE (e.g., dual mode operation). As still another example, Bluetooth module 204 can include suitable hardware for device discovery, connection establishment, and communication based only on Bluetooth BR/EDR.

RF module 206 can include any suitable combinations of hardware for performing wireless communications with wireless voice and/or data networks. For example, RF module 206 can include a RF transceiver (e.g., using mobile telephone technology such as GSM or CDMA, advanced data network technology such as 3G or EDGE) that enables a user of portable device 200 to place telephone calls over a wireless voice network.

WiFi module 208 can include any suitable combinations of hardware for performing WiFi (e.g., IEEE 802.11 family standards) based communications with other WiFi enabled devices.

Storage module 210 can be implemented, e.g., using disk, flash memory, random access memory (RAM), hybrid types of memory, optical disc drives or any other storage medium that can store program code and/or data. Storage module 210 can store software programs 214 that are executable by controller 202, including operating systems, applications, and related program code. In some embodiments, storage module 210 can additionally store vehicle access information, such as a vehicle access credential (or set of vehicle access credentials). The vehicle access credential can be encrypted or securely stored in any suitable manner.

Software programs 214 (also referred to as software or apps herein) can include any program executable by controller 202. In some embodiments, certain software programs can be installed on portable device 200 by its manufacturer, while other software programs can be installed by a user. Examples of software programs 214 can include operating systems, vehicle access applications, productivity applications, video game applications, personal information management applications, applications for playing media assets and/or navigating a media asset database, applications for controlling a telephone interface to place and/or receive calls, and so on. For example, software programs 214 can include an application that enables a user of portable device 200 to activate and control vehicle 106. Certain software programs 214 can provide communication with and/or control of portable devices, and certain software programs 214 can be responsive to control signals or other input from portable device 200.

Display module 212 can be implemented as a CRT display, an LCD display (e.g., touch screen), a plasma display, a direct-projection or rear-projection DLP, a microdisplay, and/or the like. In various embodiments, display module 212 can be used to visually display user interfaces, images, and/or the like.

Input module 216 can be implemented as a touch screen (e.g., LCD based touch screen), a voice command system, a keyboard, a computer mouse, a trackball, a wireless remote, a button, and/or the like. Input module 216 can allow a user to provide inputs to invoke the functionality of controller 202. In some embodiments, input module 216 and display module 212 can be combined or integrated. For example, portable device 200 can include an LCD-based touch screen that displays images and also captures user input. Illustratively, a user can tap his or her finger on a region of the touch screen's surface that displays an icon. The touch screen can capture the tap and, in response, start a software program associated with the icon. Upon starting the software program, a graphical user interface for the application can be displayed on the touch screen for presentation to the user.

Figure 3:
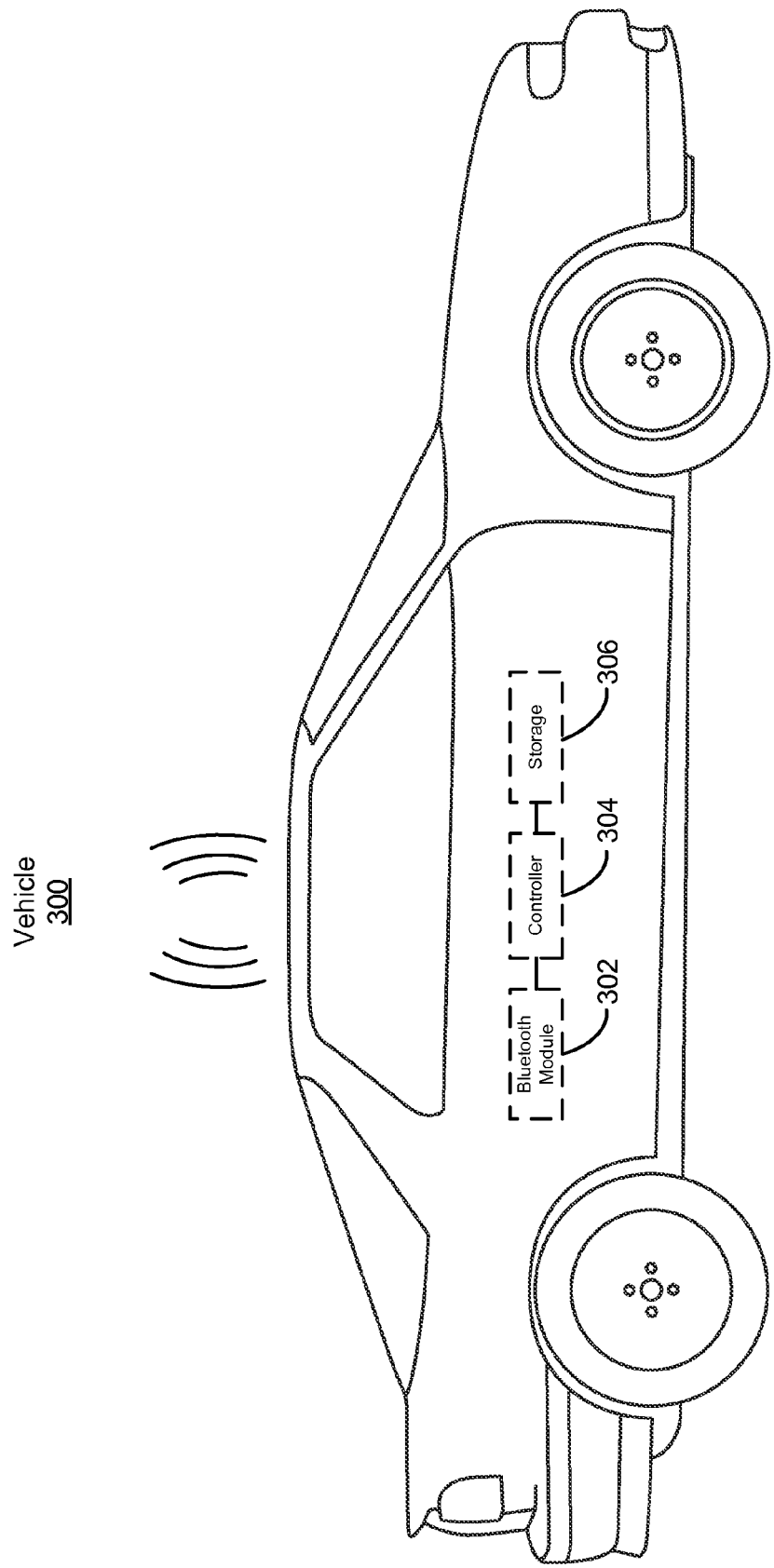
FIG. 3 illustrates an exemplary vehicle according to an embodiment of the present invention.

FIG. 3 is a diagram showing an exemplary vehicle (e.g., vehicle 106 of FIG. 1) according to an embodiment. As shown in FIG. 3, vehicle 300 can include Bluetooth module 302, controller 304, and storage module 306. As used herein, the various modules shown in FIG. 3 can be referred to collectively as a "vehicle access control system."

Bluetooth module 302 can include any suitable combinations of hardware for performing wireless communications with other Bluetooth enabled devices and allows an RF signal to be exchanged between controller 304 and other Bluetooth enabled devices. In some embodiments, Bluetooth module 302 can perform such wireless communications according to Bluetooth Basic Rate/Enhanced Data Rate (BR/EDR) and/or Bluetooth Low Energy (LE) standards. For example, Bluetooth module 302 can include suitable hardware for performing device discovery, connection establishment, and communication based on only Bluetooth LE (e.g., single mode operation). As another example, Bluetooth module 302 can include suitable hardware for device discovery, connection establishment, and communication based on both Bluetooth BR/EDR and Bluetooth LE (e.g., dual mode operation). As still another example, Bluetooth module 302 can include suitable hardware for device discovery, connection establishment, and communication based only on Bluetooth BR/EDR.

Controller 304, which can be implemented as one or more integrated circuits, can control and manages certain operations of vehicle 300. For example, controller 304 can perform various tasks, such as accessing the functionalities of various modules (e.g., interacting with other Bluetooth enabled devices via Bluetooth module 302), executing various software programs residing on storage module 306, executing various vehicle-related operations and so on. In some embodiments, controller 304 can include one or more processors (e.g., microprocessors or microcontrollers) configured to execute machine-readable instructions. Controller 304 can further be connected to storage module 306 in any suitable manner.

Storage module 306 can be implemented, e.g., using disk, flash memory, random access memory (RAM), hybrid types of memory, optical disc drives or any other storage medium that can store program code and/or data. Storage module 306 can store program code that is executable by controller 304. In some embodiments, storage module 306 can additionally store vehicle access information, such as a vehicle access credential, authorization codes, etc. The vehicle access information can be encrypted or securely stored in any suitable manner.

It will be appreciated that the portable device 200 and vehicle 300 are illustrative and that variations and modifications are possible. Further, while portable device 200 and vehicle 300 illustrated have been described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Figure 4:
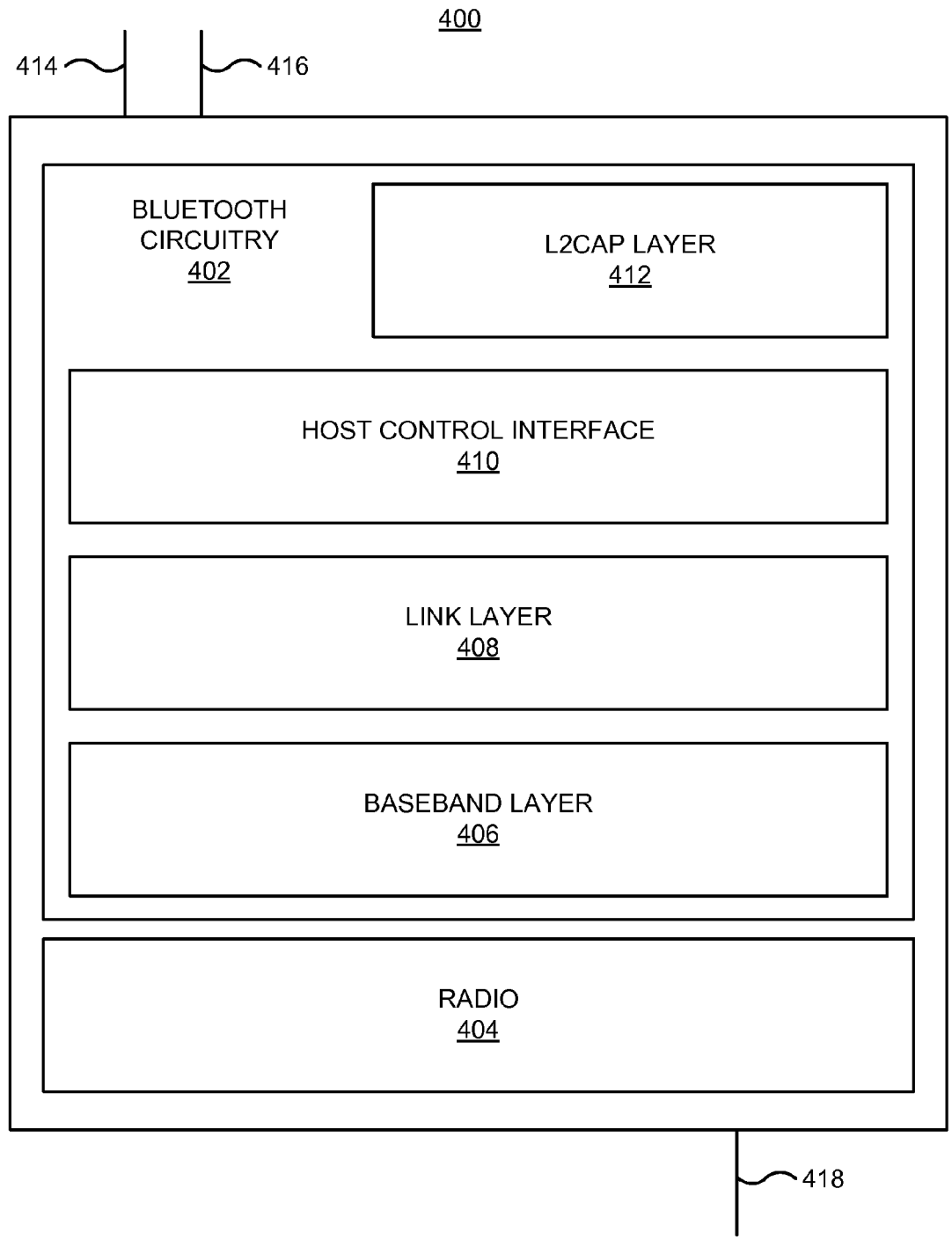
FIG. 4 illustrates an exemplary Bluetooth module according to an embodiment of the present invention.

FIG. 4 is a block diagram showing an exemplary Bluetooth module (e.g., each of Bluetooth modules 204 and 302 shown in FIGS. 2 and 3 respectively) according to one embodiment. Bluetooth module 400 can include Bluetooth circuitry 402 and radio 404. Bluetooth circuitry 402 can be any hardware and/or software elements for communicating data. In various embodiments, Bluetooth circuitry 402 and radio 404 can enable data communication based on the Bluetooth and/or Bluetooth LE standard.

In the example shown in FIG. 4, Bluetooth circuitry 402 can include Logical Link Control and Adaptation Protocol (L2CAP) layer 412, Host Control Interface (HCI) 410, Link Manager layer 408, and Baseband layer 406.

L2CAP layer 412 can include any hardware and/or software elements configured to provide connection-oriented and connectionless data services. L2CAP layer 412 can further provide protocol multiplexing capabilities, segmentation and reassembly operations, and group abstractions. In various embodiments, two link types are supported: Synchronous Connection-Oriented (SCO) links (e.g., which support real-time voice traffic using reserved bandwidth) and Asynchronous Connection-Less (ACL) links (e.g., which support best effort traffic).

HCI 410 can include any hardware and/or software elements configured to provide one or more command interfaces to Link Manager layer 408 and Baseband layer 406. HCI layer 410 can provide access to hardware status and control registers associated with Bluetooth circuitry 402.

Link Manager layer 408 can include any hardware and/or software elements configured to provide link management. Link Manager layer 408 can provide link setup, authentication, link configuration, and other protocols. In some embodiments, Link Manager layer 408 can discover other remote link managers and communicate with them via the Link Manager Protocol (LMP). In general, the Link Manager Protocol essentially consists of a number of protocol Data Units (PDUs), which are sent from one device to another.

Baseband layer 406 can include any hardware and/or software elements configured to provide management of physical channels and links. Baseband layer 406 can include a Link Controller, which works with Link Manager layer 408 for carrying out link level routines, such as link connection and power control. In various embodiments, Baseband layer 406 can manage asynchronous and synchronous links, handle packets, and perform paging and inquiry to access and inquire Bluetooth devices in the area. Baseband layer 406 can include a baseband transceiver that applies a time-division duplex (TDD) scheme (alternate transmit and receive), thus, time can be also slotted apart from different hopping frequency (frequency division).

Radio 404 can include any hardware and/or software configured to provide the requirements of a Bluetooth transceiver device using one or more predetermined frequencies, such as operating in the 2.4 GHz ISM band.

In one example of operation, Bluetooth module 400 can receive control signals using control lines 414 to operate one or more functionalities associated with Bluetooth circuitry 402 and radio 404. Bluetooth module 400 can receive or provide data using data lines 416. Control lines 414 and 416 can be connected to other components within the Bluetooth-enabled device, e.g., controller 202 of FIG. 2 or controller 304 of FIG. 3. Bluetooth module 400 can be linked to an antenna (not shown) via line 418 through which radio 404 transmits and/or receives signals.

In some embodiments, the Bluetooth module 400 can be used to establish connections with other Bluetooth modules. The connections can be used, in some instances, to enable access to and control the operations of a vehicle. Illustratively, the connections can be used to securely transmit activation messages, vehicle access credentials, and/or the like.

Examples of processes that can be used to access a vehicle using a portable device will now be described.

Figure 5:
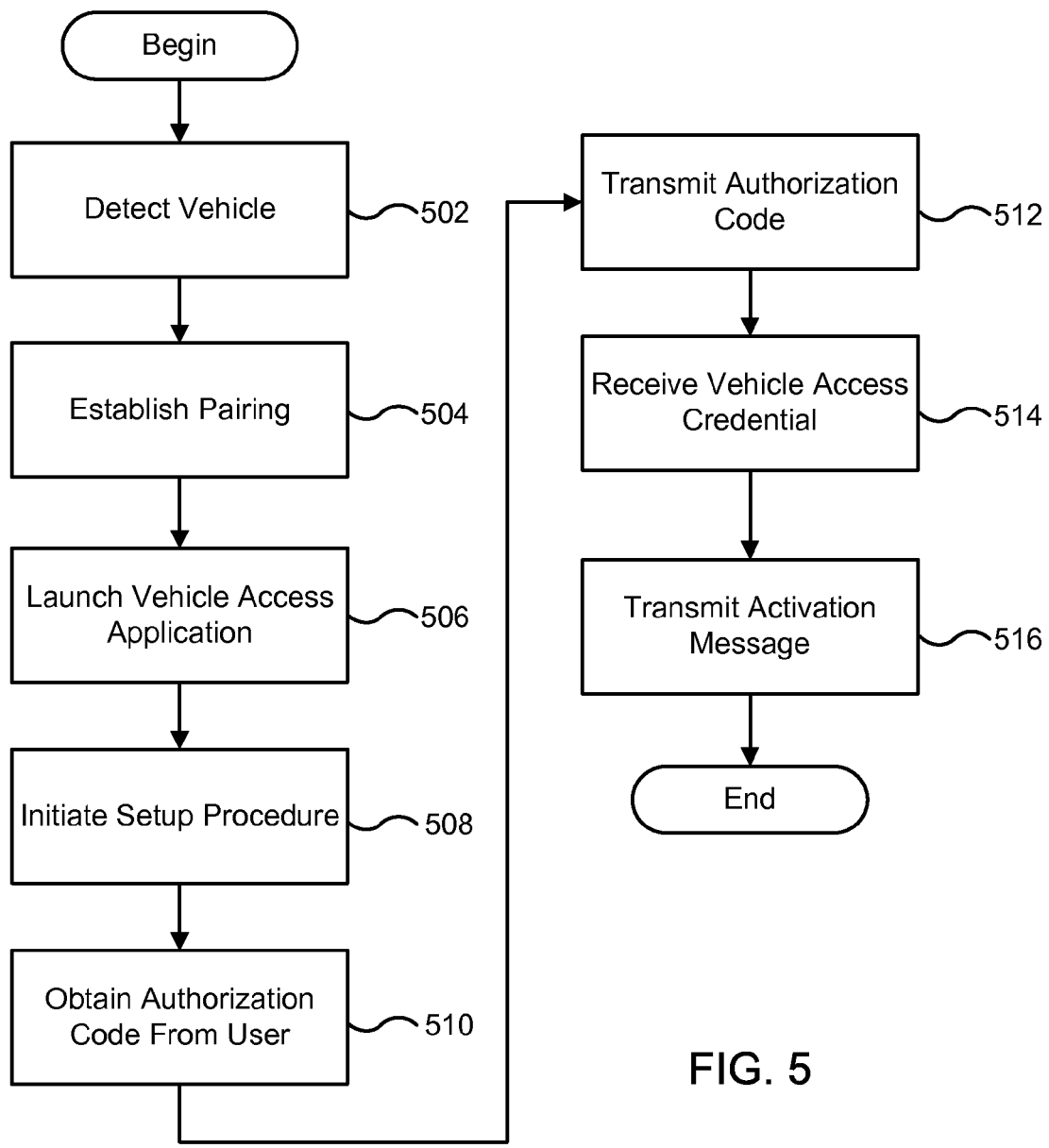
FIG. 5 is a flow diagram of a process usable by a primary portable device to access a vehicle according to an embodiment of the present invention.

FIG. 5 is a flow diagram of a process 500 for accessing a vehicle according to one embodiment. Process 500 can be performed by e.g., primary portable device 102 of FIG. 1.

Process 500 can be used, in certain embodiments, by primary portable device 102 to communicate with vehicle 106. Communications between primary portable device 102 and vehicle 106 can be facilitated by, for example, one or more Bluetooth and/or Bluetooth LE connections.

At block 502, primary portable device 102 can wirelessly detect or discover the presence of vehicle 106. For example, primary portable device 102 and vehicle 106 can be moved within a range of one another such that their respective wireless radios (e.g., a radio in a Bluetooth module) are able to detect one another over a wireless communications channel (e.g. a Bluetooth or Bluetooth LE channel).

At block 504, primary portable device 102 can be paired with vehicle 106 via a connection procedure. In some embodiments, the connection procedure can be performed according to the Bluetooth protocol. For example, various connection-related information can be exchanged including Bluetooth device addresses (e.g., BD_ADDR), clock information, and/or the like.

In certain embodiments, the connection procedure can be initiated and/or performed largely automatically. Accordingly, primary portable device 102 and vehicle 106 can be paired without user input or intervention. In other embodiments, the connection procedure can be initiated and/or performed manually or semi-automatically. For example, during the procedure, primary portable device 102 can prompt for and receive a personal identification number (PIN) from its user. The received PIN can thereafter be used to determine whether portable device 102 is permitted to establish a pairing with vehicle 106.

Following the pairing of primary portable device 102 and vehicle 106, a secure connection can be established. Communications between portable device 102 and vehicle 106 can thereafter occur over the secure connection. At block 506, primary portable device 102 can launch or execute a vehicle access application. Illustratively, a user of primary portable device 102 can select an icon associated with a vehicle access application presented on a display (e.g., touch screen) of the portable device. In response to receiving the selection from the user, primary portable device 102 can launch the application, which can be a software program installed by a manufacturer or user of the portable device.

At block 508, primary portable device 102 can initiate a setup procedure with vehicle 106. In some embodiments, the setup procedure can be initiated by the user of primary portable device 102. Illustratively, the user can interact with a graphical user interface of the aforementioned vehicle access application to indicate that the setup procedure be initiated. Primary portable device 102 can additionally or alternatively perform an automatic check to determine whether the setup procedure should be initiated. For example, upon launching the vehicle access application, primary portable device 102 can determine whether the portable device is currently configured to activate vehicle 106 such that the vehicle's operations can be accessed. If, based on the check, primary portable device 102 determines that the portable device is not currently configured, the primary portable device can automatically initiate the setup procedure. According to some embodiments, the setup procedure can be initiated by vehicle 106 and/or the user of vehicle 106. For example, a user of vehicle 106 might press a button situated within the vehicle, which can cause the setup procedure to be initiated.

At block 510, primary portable device 102 can prompt for and receive an authorization code from its user. The received authorization code can be any suitable numeric or alphanumeric value. For example, the authorization code can be a 10 digit alphanumeric value. In some embodiments, the authorization code might be obtained by the user from, for example, the seller or manufacturer of vehicle 106. In other embodiments, the authorization code might be obtained from a label attached within vehicle 106 (e.g., a label attached inside a glove compartment, etc.).

At block 512, primary portable device 102 can transmit the received authorization code to vehicle 106. In some embodiments, vehicle 106 can use the authorization code to determine whether primary portable device 102 is authorized to be configured to activate the vehicle. For example, vehicle 106 can check the authorization code against a code stored locally in a storage module of vehicle 106. If the received code matches the stored code, vehicle 106 can determine that primary portable device 102 is authorized to be configured to activate the vehicle.

At block 514, primary portable device 102 can receive a vehicle access credential from vehicle 106. In some embodiments, the vehicle access credential can include a uniquely generated value and/or other information that can be used by vehicle 106 to authenticate a portable device. In certain embodiments, primary portable device 102 can securely store the received vehicle access credential in any suitable manner. For example, the vehicle access credential can be encrypted and/or otherwise secured such that it cannot be easily understood or deciphered.

At block 516, primary portable device 102 can generate and transmit an activation message to vehicle 106. In certain embodiments, the activation message can be generated and transmitted largely automatically. Illustratively, an activation message can be generated and transmitted without user intervention whenever primary portable device 102 and vehicle 106 are connected. In other embodiments, the user of primary portable device 102 can cause the primary portable device to generate and transmit an activation message.

In some embodiments, the activation message can activate vehicle 106 such that the vehicle can be enabled to perform certain operations. Illustratively, upon receiving an activation message, vehicle 106 can enter an activated state such that a user can start its engine, turn on its radio, etc. As an example, once vehicle 106 is activated, a user of primary portable device 102 can press a button situated next to vehicle's 106 steering wheel to start the vehicle. As another example, a user can cause primary portable device 102 to launch the aforementioned access application. While the application is being executed, the user can interact with a graphical user interface of the application to select one or more vehicle-related operations to be performed. Thereafter, primary portable device 102 can issue commands to vehicle 106 to perform the selected operations.

In some embodiments, the activation message can include the vehicle access credential that primary portable device 102 previously obtained from vehicle 106. As discussed, vehicle 106 can use the vehicle access credential to authenticate primary portable device 102 as a device permitted to activate the vehicle. Once primary portable device 102 is authenticated, vehicle 106 can be activated such that one or more of its operations are accessible to a user. Illustratively, a user can press a button situated in vehicle 106 to, for example, turn on the vehicle's radio system.

In some embodiments, the activation message transmitted by primary portable device 102 can be sent over a wireless connection that is different from the connection over which primary portable device 102 received the vehicle access credential. More specifically, after primary portable device 102 receives the vehicle access credential from vehicle 106, the wireless connection between primary portable device 102 and vehicle 106 can be terminated. The connection can be terminated because, for example, primary portable device 102 and vehicle 106 are moved out of range from one another. Thereafter, primary portable device 102 and vehicle 106 can once again be moved within range. Because the primary portable device and vehicle were previously paired, a new wireless connection can be automatically established. Subsequently, an activation message can be sent over the newly established connection.

Figure 6:
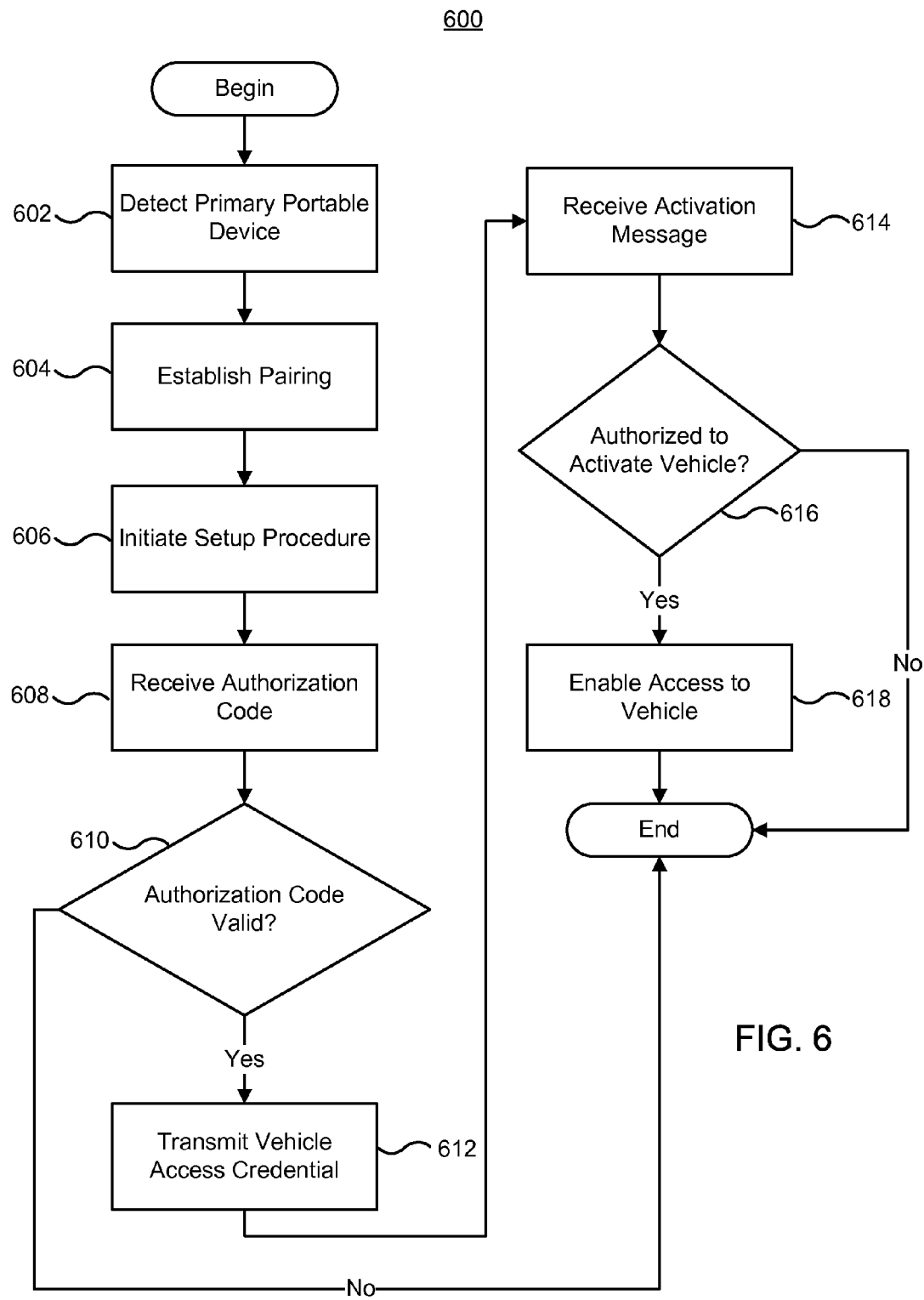
FIG. 6. is a flow diagram of a process usable by a vehicle to perform a vehicle-related operation according to an embodiment of the present invention.

FIG. 6 is a flow diagram of a process 600 for performing a vehicle-related operation according to one embodiment. Process 600 can be performed by e.g., vehicle 106 of FIG. 1. Process 600 can be used, in certain embodiments, by vehicle 106 to communicate with primary portable device 102. Communications between vehicle 106 and primary portable device 102 in process 600 can be facilitated by, for example, one or more Bluetooth or Bluetooth LE connections.

At block 602, vehicle 106 can wirelessly detect or discover the presence of primary portable device 102. At block 604, vehicle 106 can be paired with primary portable device 102 through a connection procedure. The connection procedure can be similar to the connection procedure previously described in process 500 of FIG. 5. In some embodiments, the connection procedure to pair vehicle 106 and primary portable device 102 can be performed according to the Bluetooth protocol. Following the pairing of vehicle 106 and primary portable device 102, a secure connection between the device and vehicle can be established. Communication between the vehicle and primary portable device can thereafter occur over the secure connection.

At block 606, vehicle 106 can initiate a setup procedure with primary portable device 102. The setup procedure can be used to configure primary portable device 102 such that the device can activate vehicle 106. In some embodiments, a user can press a button or interact with a dashboard console situated within vehicle 106 to initiate the setup procedure. In other embodiments, primary portable device 102 and/or a user of primary portable device 102 can initiate the setup procedure.

At block 608, vehicle 106 can receive an authorization code from primary portable device 102. In some embodiments, the received authorization code can be a suitable numeric or alphanumeric value. At block 610, vehicle 106 can determine, based on the received authorization code, whether primary portable device 102 is authorized to activate the vehicle. Vehicle 106 can make such a determination, for example, by comparing the received authorization code to an authorization code stored locally in a storage module of vehicle 106. In some embodiments, the locally stored authorization code might have been provided to vehicle 106 during, for example, manufacturing. If the received and stored authorization codes match, vehicle 106 can determine that the authorization code is valid, and that primary portable device 102 can be configured to activate the vehicle.

If it is determined that primary portable device 102 is authorized to activate vehicle 106, the vehicle can transmit a vehicle access credential to primary portable device 102 at block 612. The vehicle access credential can be subsequently used by a device to activate vehicle 106 such that one or more of the vehicle's operations are accessible or enabled. More specifically, following activation, a user can cause the vehicle to perform one or more vehicle-related operations. In certain embodiments, vehicle 106 can randomly or pseudo-randomly generate the vehicle access credential. Alternatively, the credential can be provided to and locally stored in vehicle 106 at a previous time e.g., during manufacturing, prior to being sold by a dealer, etc.

In some embodiments, the vehicle access credential can be encrypted or secured in a suitable manner prior to its transmission to primary portable device 102. As a simple example, vehicle 106 can encrypt the access credential just prior to transmitting the credential to primary portable device 102. Later, when the credential is transmitted back to vehicle 106, the provided credential can be decrypted and its authenticity determined (e.g., vehicle 106 can determine whether the received credential has been modified, is fake, etc.).

At block 614, vehicle 106 can receive an activation message from primary portable device 102. In some embodiments, the activation message can include the vehicle access credential previously transmitted to primary portable device 102. At decision 616, vehicle 106 can determine whether primary portable device 102 is authorized to activate the vehicle. Vehicle 106 can make such a determination by determining the authenticity of the vehicle access credential included in the activation message. As a simple example, the access credential included in the activation message can be received in an encrypted form. Vehicle 106 can decrypt the credential using a cryptographic key to determine the credential's authenticity.

At block 618, if it is determined that the received vehicle access credential is authentic, vehicle 106 can enter an active state such that one or more of the vehicle's operations are accessible. Illustratively, upon determining that a received vehicle access credential is authentic, vehicle 106 can be activated such that a user can start its engines, turn on its radio, etc. As an example, a user of primary portable device 102 can press a button situated next to vehicle's 106 steering wheel to start the vehicle. As another example, vehicle 106 can receive commands from primary portable device 102 indicating the vehicle perform one or more operations. Upon receiving the commands, vehicle 106 can perform the indicated operations.

If it is determined the received vehicle access credential is not authentic, vehicle 106 can enter or remain in an inactive state. As such, vehicle's 106 supported operations might not be accessible. In some embodiments, vehicle 106 can indicate to primary portable device 102 that the device is not authorized to activate the vehicle. Primary portable device 102 can, in response, provide a notification or alert to its user.

In some embodiments, vehicle 106 can be configured such that the vehicle can only be operated when connected to a portable device that includes the vehicle access credential. For example, vehicle 106 can be configured such that the vehicle's engines can only be started in the presence of primary portable device 102. In this way, primary portable device 102 can act as the primary security point for vehicle 106.

Figure 7:
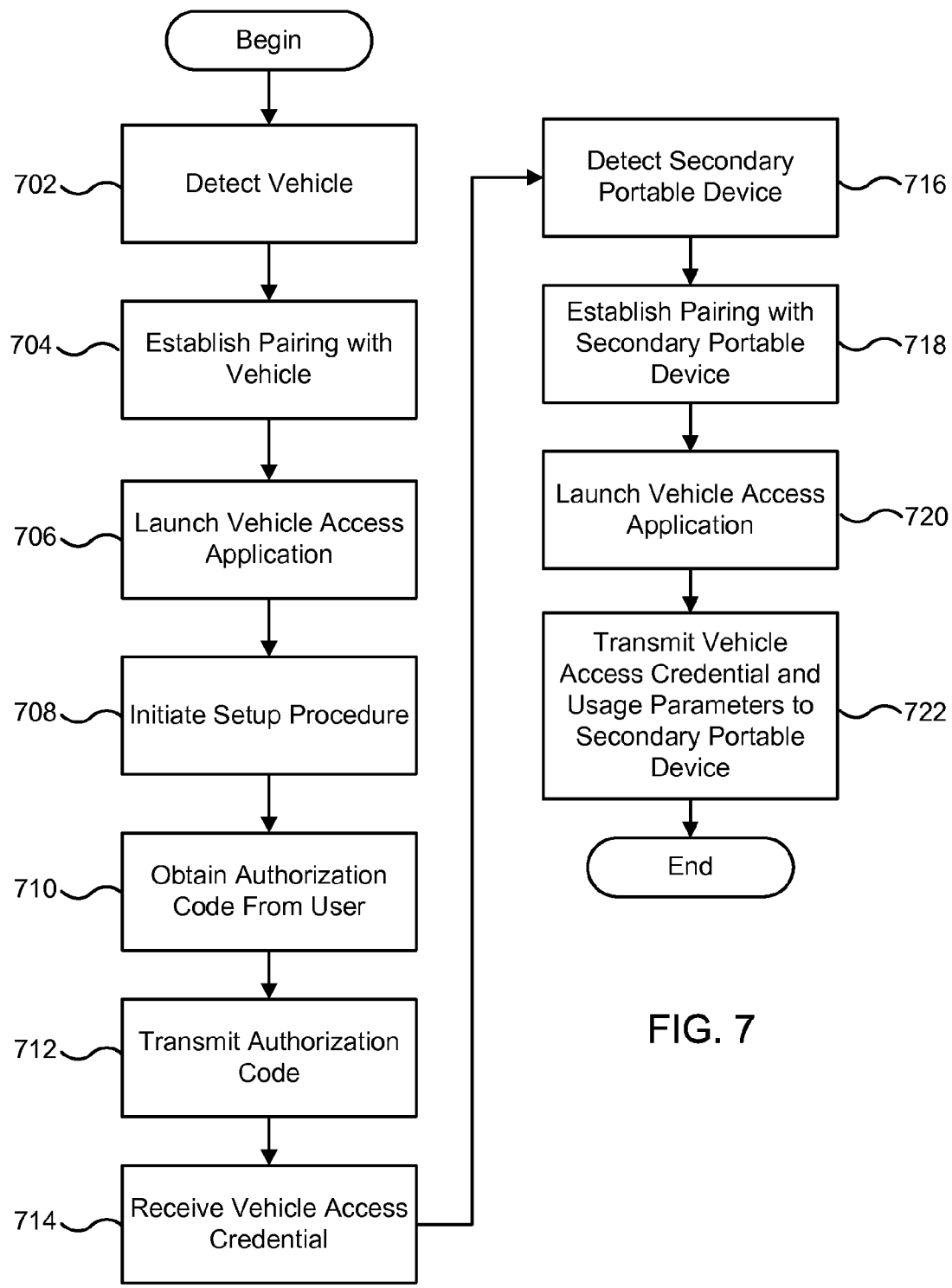
FIG. 7 is a flow diagram of a process usable by a primary portable device to enable a secondary portable device to access a vehicle according to an embodiment of the present invention.

FIG. 7 is a flow diagram of a process 700 for enabling a secondary portable device to access a vehicle according to one embodiment. Process 700 can be performed by e.g., primary portable device 102 of FIG. 1. Process 700 can be used by primary portable device 102, in certain embodiments, to communicate with vehicle 106 and secondary portable device 104. Communications among the various entities in process 700 can be facilitated by, for example, one or more Bluetooth and/or Bluetooth LE connections, Wi-Fi connections, cellular data networks or the like.

Blocks 702-714 can be similar to blocks 502-514 shown in FIG. 5. For example, primary portable device 102 can detect and pair with vehicle 106. Thereafter, primary portable device 102 and vehicle 106 can perform a setup procedure such that primary portable device can be enabled to activate vehicle 106. In some embodiments, primary portable device 102 can provide a cryptographic key (e.g., either a shared key or one of a public/private pair) to vehicle 106, which can be used by the vehicle to verify any later received information purportedly originating from the primary portable device.

At block 716, primary portable device 102 can wirelessly detect or discover the presence of secondary portable device 104. For example, primary portable device 102 and vehicle 104 can be moved within a range of one another such that their respective radios are able to detect one another over a wireless communications channel (e.g., a Bluetooth or Bluetooth LE channel).

At block 718, primary portable device 102 can pair with secondary portable device 104 via a connection procedure. In some embodiments, the connection procedure can be performed according to the Bluetooth protocol. Once primary portable device 102 and secondary portable device 104 are paired, a secure connection between the devices can be established. In certain embodiments, the connection procedure can be initiated largely automatically. In other embodiments, the connection procedure can be initiated and performed manually or semi-automatically (e.g., a user must provide a PIN, etc.).

At block 720, primary portable device 102 can thereafter launch or execute a vehicle access application. At block 722, primary portable device 102 can transmit a vehicle access credential and/or other information to secondary portable device 104. More specifically, while the vehicle access application is being executed, primary portable device 102 can receive an indication from its user that secondary portable device 104 be configured to enable access to vehicle 106. For example, the user can interact with a graphical user interface of the vehicle access application to provide such an indication to primary portable device 102. In response, primary portable device 102 can transmit a vehicle access credential to secondary portable device 104. In some embodiments, the transmitted vehicle access credential can be the same credential that primary portable device 102 previously obtained from vehicle 106.

In certain embodiments, upon transmitting the vehicle access credential, primary portable device 102 can be prevented from activating vehicle 106 in the future. In this way, only one portable device can be used to operate a vehicle at any one time. In other embodiments, primary portable device 102 is not prevented from activating vehicle 106 following the transmission of the access credential to secondary portable device 104.

According to some embodiments, primary portable device 102 can transmit a set of usage parameters to secondary portable device 104. The usage parameters can, in some embodiments, limit the manner in which vehicle 106 can be operated when the vehicle is activated using secondary portable device 104. For example, the usage parameters can restrict the types of operations vehicle 106 is able to perform. Illustratively, a usage parameter can specify that only a door unlock operation is accessible when vehicle 106 is activated using secondary portable device 104. As another example, the usage parameters can limit the number of times vehicle 106 can be accessed using secondary portable device 104. Illustratively, a usage parameter can indicate that vehicle's 106 engines can only be started once when the vehicle is activated using secondary portable device 104. As yet another example, the usage parameters can limit the time period during which vehicle's 106 operations are accessible. Illustratively, a usage parameter can indicate that vehicle's 106 operations are to be accessible only within a specific one hour period. As yet another example, the usage parameters can restrict the operating characteristics of one or more accessible operations. Illustratively, a engine start up operation can be accessible when vehicle 106 is activated by secondary portable device 104. However, the engine's performance can be limited such that vehicle 106 is not permitted to exceed a speed of 45 mph.

In some embodiments, the usage parameters can include any suitable information for verifying that the parameters originated from primary portable device 102. For example, the usage parameters can be digitally signed using a cryptographic key. The key can be the counterpart to the key previously provided to vehicle 106 by primary portable device 102. The key previously provided to vehicle 106 can be used by vehicle 106 to verify the usage parameters. In this way, the usage parameters cannot be compromised or easily modified.

In some embodiments, while secondary portable device 104 is being used to operate vehicle 106, primary portable device 102 can receive various types of operating and location information from secondary portable device 104. In certain embodiments, primary portable device 102 can retrieve such information from secondary portable device 104 e.g., when the devices are in proximity. For example, secondary portable device 104 can record a history of its movement, record the vehicle-related operations that were accessed, etc. Such information can later be retrieved by or reported to primary portable device 102 when the devices are in proximity. Information can be received in any suitable manner. For example, the information can be received via the Bluetooth, RF, and/or WiFi modules of primary portable device 102. In some embodiments, the information can include positioning information (e.g., GPS coordinates), speed information (e.g., speed measurements collected by an acceleration detection module), vehicle operating information received from vehicle 106 (e.g., engine status information, vehicle battery status information, vehicle entertainment system status information, etc.), and/or the like.

Figure 8:
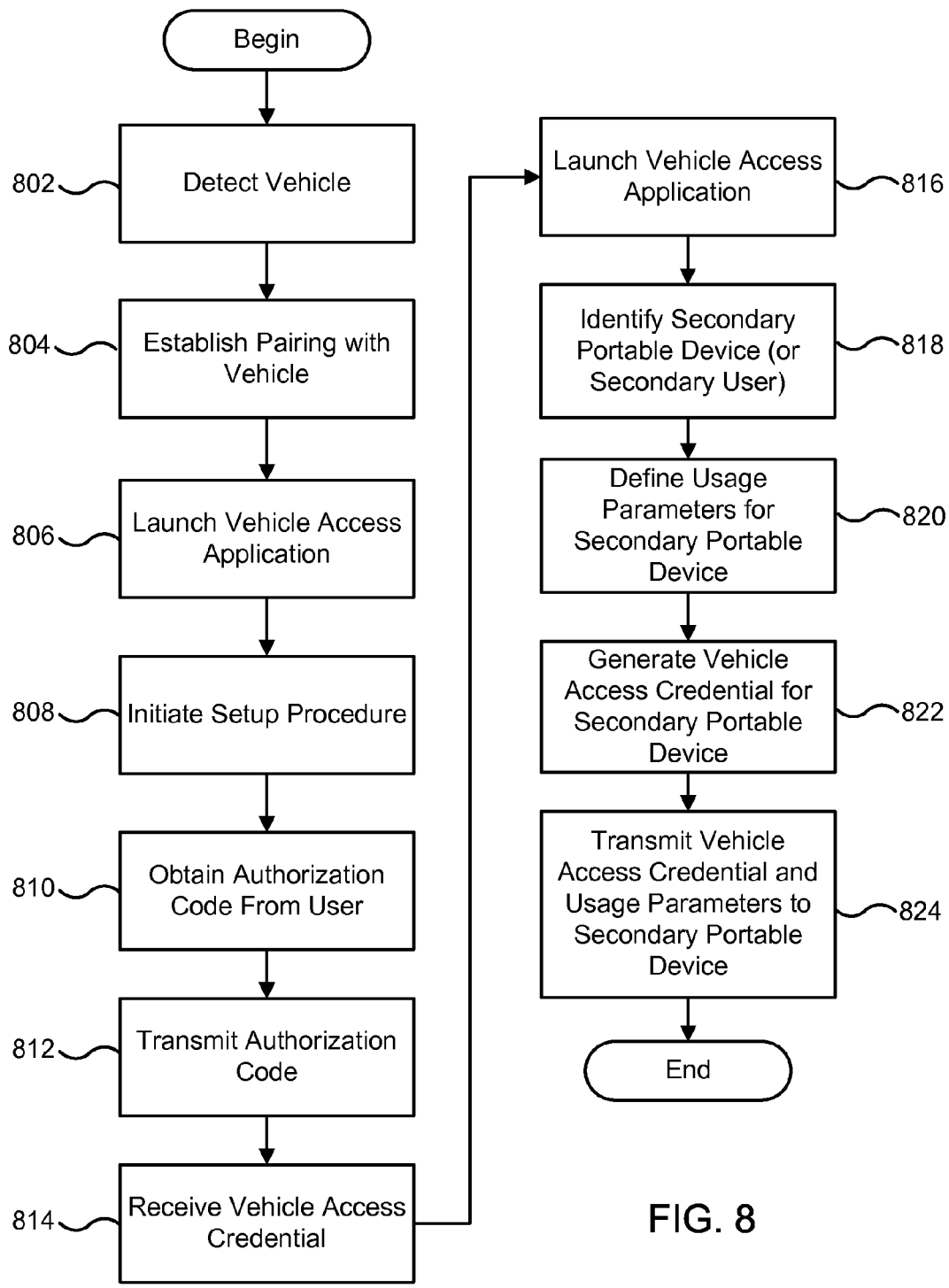
FIG. 8 is a flow diagram of a process usable by a primary portable device to enable a secondary portable device to access a vehicle according to another embodiment of the present invention.

In some embodiments, the primary access device and secondary access device do not need a direct connection in order to exchange information. FIG. 8 is a flow diagram of a process 800 for enabling a secondary portable device to access a vehicle according to another embodiment of the present invention. Process 800 can be performed by e.g., primary portable device 102 of FIG. 1. Process 800 can be used by primary portable device 102, in certain embodiments, to communicate with vehicle 106 and secondary portable device 104. Communications among the various entities in process 800 can be facilitated by, for example, one or more Bluetooth and/or Bluetooth LE connections, Wi-Fi connections, cellular data networks or the like.

Blocks 802-814 can be similar to blocks 502-514 shown in FIG. 5. For example, primary portable device 102 can detect and pair with vehicle 106. Thereafter, primary portable device 102 and vehicle 106 can perform a setup procedure such that primary portable device can be enabled to activate vehicle 106. In some embodiments, primary portable device 102 can provide a cryptographic key (e.g., either a shared key or one of a public/private pair) to vehicle 106, which can be used by the vehicle to verify any later received information purportedly originating from the primary portable device.

At block 816, primary portable device 102 can launch a vehicle access application. This application can provide, among other features, an interface to allow a user of primary portable device 102 to selectively share access credentials with other devices. At block 818, the user interacting with the vehicle access application identify a secondary portable device or a secondary user to whom access is to be granted via a secondary portable device. For example, the user can provide a mobile phone number associated with the secondary portable device or an e-mail address associated with the secondary user. At block 820, the user can define usage parameters for the secondary portable device. For example, the usage parameters can limit the time period when the vehicle can be used, the number of times the vehicle can be used, the vehicle-related operations that can be performed (e.g., accessing the passenger compartment but not storage areas such as a trunk or glove compartment), the maximum speed at which the vehicle can be operated, and so on.

At block 822, the vehicle access application can generate a vehicle access credential for the secondary portable device. The vehicle access credential can include the access credential that primary portable device 102 previously obtained from vehicle 106 and may also incorporate other information, such as the usage parameters defined at block 820. The vehicle access credential may also include information that can be used later to authenticate the secondary portable device or a user thereof. For example, the credential can include a personal identification code that a user of the secondary portable device will be required to provide when attempting to access the vehicle. The credential can also include the identification of the secondary portable device or user as established at block 818.

At block 824, the primary portable device can transmit the vehicle access credential (including any usage parameters) to the secondary portable device. In some embodiments, this can be done using a Bluetooth or another direct and secure channel between the devices. However, Bluetooth may not be available if the two devices are not in close enough proximity at the time the credential is to be transmitted. Accordingly, other channels can be used. For example, the vehicle access credential can be sent via an e-mail to the e-mail address provided at block 818, or the vehicle access credential can be sent as an MMS message to the mobile phone number associated with the secondary portable device. Any other communication channel, whether direct or indirect, can also be used.

In some embodiments, the vehicle access credential can be transmitted via a channel that is not inherently secure (e.g., e-mail or MMS). Accordingly, the credential itself can be encrypted prior to transmission, e.g., using a key associated with the primary portable device, and a key to decrypt the credential can be provided to the secondary portable device via a separate communication using the same channel or a different channel. For example, as noted above, the credential generated at block 822 can include a personal identification code. In some embodiments, that code can be used for decrypting an encrypted credential, and the personal identification code can be communicated separately from the credential. In some embodiments, the personal identification code can be sent in a separate e-mail message or text message from the credential, or the code can be displayed on the primary portable device, and the user of the primary portable device can read the code to the user of the secondary portable device. The user of the secondary portable can enter the code into a vehicle access application executing on the secondary portable device, enabling the secondary portable device to decrypt the credential.

Figure 9:
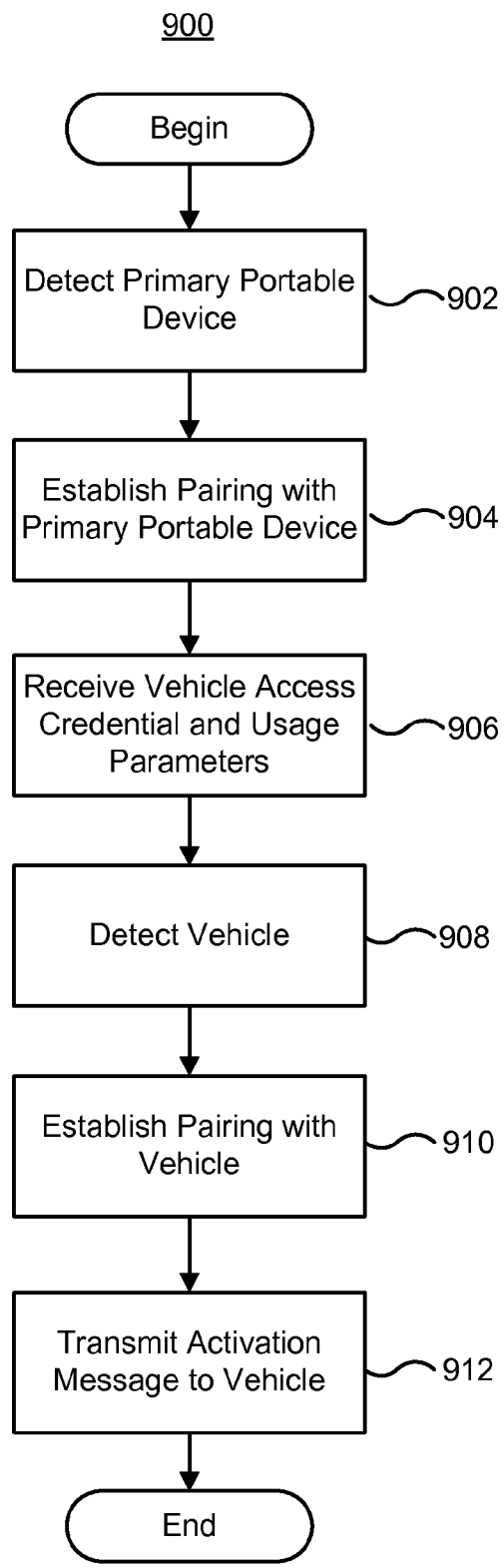
FIG. 9 is a flow diagram of a process usable by a secondary portable device to access a vehicle according to an embodiment of the present invention.

Regardless of the communication channel used, the secondary portable device can receive the transmitted credential and thereafter use it to access the vehicle. FIG. 9 is a flow diagram of a process 900 for accessing a vehicle according to one embodiment. Process 900 can be performed by e.g., secondary portable device 104 of FIG. 1. Process 900 can be used by secondary portable device 104, in certain embodiments, to communicate with vehicle 106 and primary portable device 102. Communications among the various entities in process 900 can be facilitated by, for example, one or more Bluetooth and/or Bluetooth LE connections.

At block 902, secondary portable device 104 can wirelessly detect or discover the presence of primary portable device 102 over a wireless communications channel. At block 904, secondary portable device 104 can be paired with primary portable device 102 through a connection procedure. In some embodiments, the connection procedure can be performed according to a wireless communications protocol, such as the Bluetooth protocol. Once secondary portable device 104 and primary portable device 102 are paired, a secure connection between the device and vehicle can be established. In certain embodiments, the connection procedure can be initiated largely automatically. In other embodiments, the connection procedure can be initiated and performed manually or semi-automatically (e.g., a user must provide a PIN, etc.). In still other embodiments, detecting and pairing with the primary portable device is not required; for example, as described above, a vehicle access credential can be transmitted via e-mail, MMS, or other network connections.

At block 906, secondary portable device 104 can receive a vehicle access credential from primary portable device 102. In some embodiments, secondary portable device 104 can additionally receive usage parameters from primary portable device 102. As discussed, the usage parameters can limit the manner in which vehicle 106 can be operated when the vehicle is activated using secondary portable device 104. As an example, the usage parameters can specify that vehicle's 106 supported operations can only be accessed during a certain single time period.

In some embodiments, secondary portable device 104 can receive a vehicle access credential from primary portable device 102 without establishing a pairing. For example, as described above with reference to FIG. 8, secondary portable device 104 can receive a credential via e-mail, MMS, or other data communication services. Accordingly, blocks 902 and 904 can be omitted.

At block 908, secondary portable device 104 can wirelessly detect or discover the presence of vehicle 106. At block 910, secondary portable device 104 can be paired with vehicle 106 through a connection procedure. In some embodiments, the connection procedure can be performed according to the Bluetooth protocol. Once secondary portable device 104 and vehicle 106 are paired, a secure connection between the device and vehicle can be established.

At block 912, secondary portable device 104 can generate and transmit an activation message to vehicle 106. In certain embodiments, the activation message can be generated and transmitted largely automatically. Illustratively, once the connection is established between secondary portable device 104 and vehicle 106, an activation message can be generated and transmitted without user intervention. In other embodiments, the user of secondary portable device 104 can cause the secondary portable device to generate and transmit an activation message. In some embodiments, the user of secondary portable device 104 can be prompted to enter a personal identification code (e.g., the code described above with reference to FIG. 8) or to perform another action in connection with transmitting the activation message to vehicle 106.

In some embodiments, the activation message can cause vehicle 106 to be activated such that one or more of the vehicle's operations are accessible. Once the operations are accessible a user can, in any suitable manner, control one or more operations of vehicle 106. Illustratively, upon receiving an activation message, vehicle 106 can be activated such that a user can start the vehicle's engines, turn on the vehicle's radio, etc. As an example, a user of secondary portable device 104 can press a button situated next to vehicle's 106 steering wheel to start the vehicle. As another example, a user can interact with a graphical user interface of the aforementioned vehicle access application to select one or more vehicle-related operations to be performed. Thereafter, secondary portable device 104 can issue commands to vehicle 106 indicating that the vehicle perform the selected operations.

In some embodiments, the activation message can include the vehicle access credential that secondary portable device 104 previously obtained from primary portable device 102. As discussed, vehicle 106 can use the vehicle access credential to authenticate secondary portable device 104 as a device permitted to activate the vehicle. Once primary portable device 102 is authenticated, vehicle 106 can be activated such that one or more of its operations are accessible to a user. Illustratively, a user can press a button situated in vehicle 106 to, for example, turn on the vehicle's radio system.

In certain embodiments, secondary portable device 104 can transmit a set of usage parameters to vehicle 106. The usage parameters can, in some embodiments, limit the manner in which vehicle 106 can be operated when the vehicle is activated by secondary portable device 104. Illustratively, the usage parameters can indicate that only a limited set of operations can be performed. For instance, the usage parameters can indicate that only a door unlock operation can be performed when vehicle 106 is activated using secondary portable device 104. In some embodiments, because secondary portable device 104 did not directly perform a setup procedure with vehicle 106, secondary portable device 104 can be required to transmit the usage parameters to vehicle 106.

In some embodiments, while secondary portable device 104 is being used to operate vehicle 106, the secondary portable device can transmit various types of operating and location information to primary portable device 102. The information can be transmitted in any suitable manner. For example, the information can be transmitted via the Bluetooth, RF, and/or WiFi modules of secondary portable device 104. In some embodiments, the information can include positioning information (e.g., GPS coordinates), speed information (e.g., speed measurements collected by an acceleration detection module), vehicle operating information (e.g., operational information received from vehicle 106), and/or the like.

In certain embodiments, secondary portable device 104 can be configured to transmit the access credential and/or usage parameters to other portable devices. Thereafter, those portable devices can similarly transmit activation messages to vehicle 106 in order to activate the vehicle. In certain embodiments, once an access credential is transferred from secondary portable device 104 to another portable device, the secondary portable device can no longer activate vehicle 106.

Figure 10:
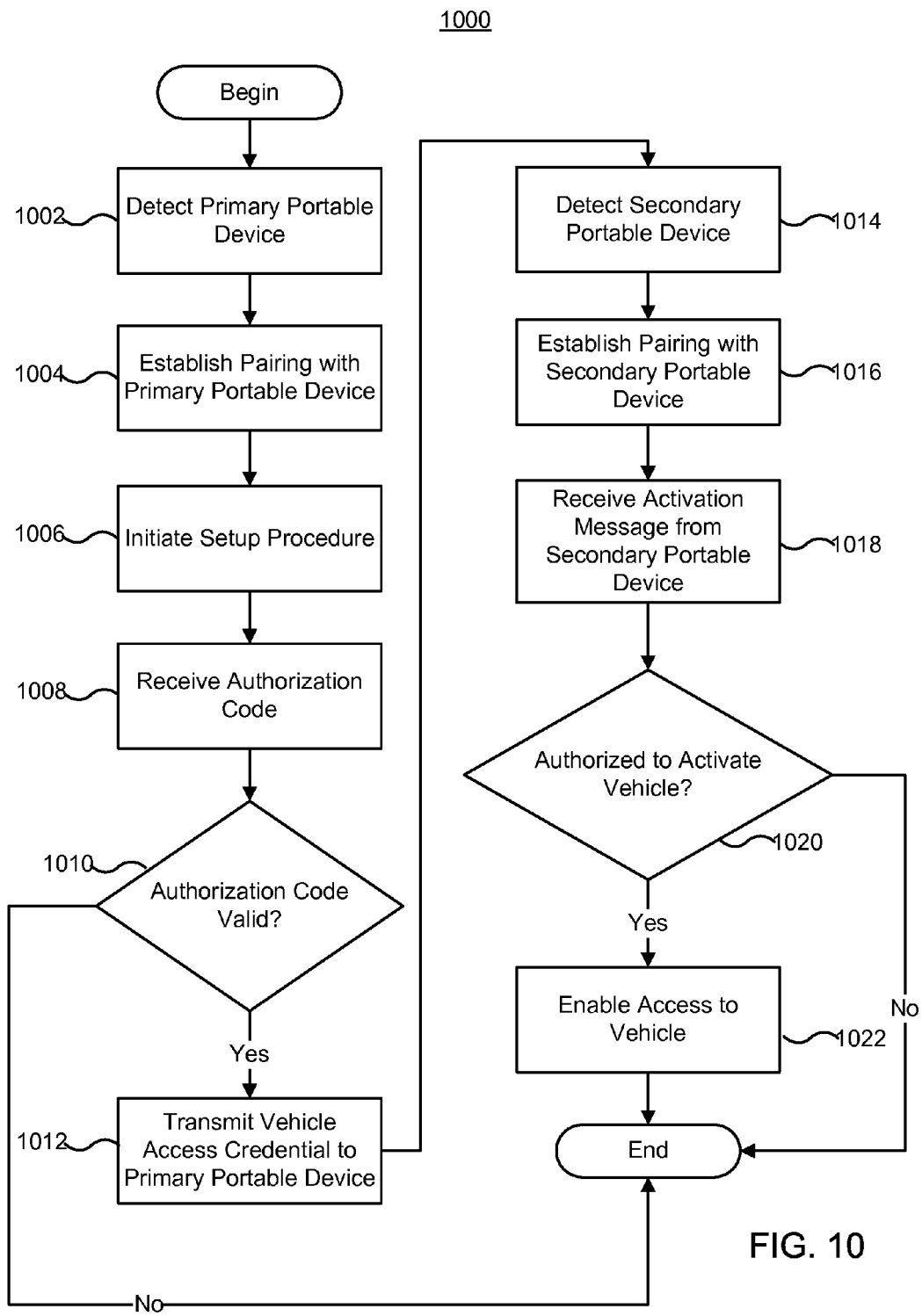
FIG. 10. is a flow diagram of a process usable by a vehicle to perform a vehicle-related operation according to an embodiment of the present invention.

FIG. 10 is a flow diagram of a process 1000 for performing a vehicle-related operation according to one embodiment. Process 1000 can be performed by e.g., vehicle 106 of FIG. 1. Process 1000 can be used by vehicle 106, in certain embodiments, to communicate with a primary portable device and a secondary portable device. Communications among the various entities in process 1000 can be facilitated by, for example, one or more Bluetooth and/or Bluetooth LE connections.

Blocks 1002-1012 can be similar to blocks 602-612 shown in FIG. 6. In particular, vehicle 106 can detect and pair with primary portable device 102. Thereafter, vehicle 106 and primary portable device 102 can perform a setup procedure such that primary portable device can be enabled to control the operations of vehicle 106. In some embodiments, vehicle 106 can receive a cryptographic key from primary portable device 102.

At block 1014, vehicle 106 can wirelessly detect or discover the presence of secondary portable device 104. At block 1016, vehicle 106 can be paired with secondary portable device 104 through a connection procedure. In some embodiments, the connection procedure can be performed according to the Bluetooth protocol. Once vehicle 106 and secondary portable device 104 are paired, a secure connection between the device and vehicle can be established.

At block 1018, vehicle 106 can receive an activation message from secondary portable device 104. In some embodiments, the activation message can include a vehicle access credential. According to some embodiments, vehicle 106 can recognize that secondary portable device 104 is not a device with which the vehicle has directly performed a setup procedure. As a result, vehicle 106 can additionally require that secondary portable device provide usage parameters to the vehicle.

At decision 1020, vehicle 106 can determine whether secondary portable device 104 is authorized to activate the vehicle such that one or more of the vehicle's operations can be accessed. In some embodiments, as part of such a determination, vehicle 106 can determine the authenticity of the vehicle access credential included in the activation message. Vehicle 106 can use any suitable security scheme (e.g., a cryptographic scheme) to determine the authenticity of the activation message. In certain embodiments, vehicle 106 can additionally determine the authenticity of the usage parameters received from secondary portable device 104. Illustratively, the usage parameters can be digitally signed by primary portable device 102. Vehicle 106 can use a cryptographic key previously received from primary portable device 102 to verify that the usage parameters are authentic. As a simple example, vehicle 106 can compute a first hash value for the usage parameters using a suitable hash function.

Thereafter, vehicle 106 can decrypt the signature used to sign the usage parameters with a key received from primary portable device 102. If the value of the decrypted signature matches the hash value, vehicle 106 can determine that the usage parameters are authentic.

If both the vehicle access credential and usage parameters are determined to be authentic, vehicle 106 can, at block 1022, enter into an activated state such that the vehicle can be enabled for access. More specifically, vehicle 106 can permit secondary portable device 104 and/or a user of the secondary portable device to access one or more of the vehicle's operations.

In some embodiments, vehicle 106 can subsequently receive a command to perform a certain operation. The command can be sent to vehicle 106 in any suitable manner. For example, a user can press a button situated next to a steering wheel of vehicle 106. The button press can convey to vehicle 106 that the vehicle start its engine. As another example, a user can press a button displayed on a screen of a dashboard console of vehicle 106. The press can similarly convey to vehicle 106 that the vehicle start its engine. As another example, a user can interact with secondary portable device 104 (e.g., via a touch screen display of the portable device) such the secondary portable device transmits e.g., a door unlock command, an engine start command, etc. to vehicle 106.

Upon receiving a command, vehicle 106 can proceed to check the command against the usage parameters received from secondary portable device 104. For example, vehicle 106 can check whether a door unlock operation is permitted based on the usage parameters.

If it is determined that vehicle 106 can be controlled in the manner indicated by the command, vehicle 106 can perform the requested operation. If it is determined that vehicle 106 is not permitted to be controlled in the manner indicated by the command, vehicle 106 can indicate to secondary portable device 104 that the requested operation cannot be performed. Secondary portable device 104 can, in response, provide a notification or alert to its user.

In some embodiments, vehicle 106 can be configured such that the vehicle can only be operated when connected to a portable device that includes the vehicle access credential. For example, vehicle 106 can be configured such that the vehicle's engines can only be started in the presence of an activating portable device.

It will be appreciated that embodiments illustrated in FIGS. 5-10 can implement any suitable security mechanisms to ensure that vehicle access credentials and/or other types of access information are not improperly compromised, modified, obtained, etc. For example, the embodiments described in FIGS. 5-10 can employ any suitable symmetric and asymmetric cryptographic scheme.

Furthermore, while the embodiments illustrated in FIGS. 5-10 use specific access control and distribution structures, any suitable access control and distribution structure can be used.

For example in certain embodiments, an access credential can include a set of vehicle access keys. In some of these embodiments, each vehicle access key can be associated with a specific vehicle-related operation and/or set of usage parameters. Illustratively, a first access key can be associated with a door unlock operation. A second vehicle access key can be associated with a seat adjustment operation. As a result, in order to enable access to the vehicle door unlock operation, a portable device would have to transmit an activation message including the vehicle access key associated with the operation.

In other embodiments, each vehicle access key can be associated with a different access level. Each access level can, in turn, be associated with a particular set of vehicle-related operations and/or set of usage parameters. For example, a first vehicle access key can be associated with an owner access level. As a result, a portable device that transmits an activation message including the first vehicle access key can activate the vehicle such that any supported vehicle-related operation can be accessed. By contrast, a second vehicle access key can be associated with a restricted or guest access level. As such, a portable device that transmits an activation message including the second vehicle access key can activate the vehicle such that only a limited number of vehicle-related operations can be accessed.

As another example, in some embodiments, the access credential provided to a primary portable device (designated as the primary access credential) from a vehicle might not be the same as the access credential provided to a secondary portable device (designated as the secondary access credential) from the primary portable device. Rather, the secondary access credential can be partially derived from or wholly different from the primary access credential. In such embodiments, the primary portable device can digitally sign the secondary access credential or use some other suitable mechanism for allowing the vehicle to verify that the secondary access credential originated from the primary portable device.

As yet another example, in certain embodiments, an access credential might not be received by a primary portable device from a vehicle. Rather, the primary portable device and vehicle can establish and/or exchange cryptographic keys (e.g., each of the primary portable device and vehicle can store a key). In order to activate the vehicle, the primary portable device can digitally sign, with its cryptographic key, data included in an activation message transmitted to the vehicle. The vehicle can thereafter verify the data by using the vehicle's cryptographic key. In order to enable a secondary portable device to activate the vehicle, the primary portable device can provide data, including usage parameters, to the secondary portable device. The data can be digitally signed using the primary portable device's cryptographic key. Thereafter, the secondary portable device can activate the vehicle by providing the digitally signed data received from the primary portable device. The vehicle can verify that the data originated from the primary portable device by using the vehicle's cryptographic key.

Additionally, while embodiments disclosed herein are directed to vehicles, it will be appreciated that other embodiments can be directed to other access control and distribution contexts. For example, a primary and secondary portable devices can be used to access the operations of a building. For example, a primary portable device can be used to activate the various systems of a building, such that a user can unlock a door to the building, turn on its lights, trigger a sprinkler system, turn off a security alarm, etc. The primary device can provide building access credentials to a secondary device, etc. Usage parameters associated with access to the building can be provided as well. For example, the secondary portable device can be restricted to accessing certain areas of the building (e.g., specific floors or rooms), to accessing the building during certain times of day or during a limited time period (e.g., a particular date range), or the like; the secondary portable device can also be limited as to the systems that can be activated, e.g., controlling doors and lights but not security alarms, etc. In still other embodiments, a primary device can be used to access and/or control various systems for a secured but generally stationary object (e.g., a safe, a vault, a refrigerator, an item of workout equipment, or the like), and the primary device can be used as described herein to provide an access credential to a secondary device and to control the type and duration of access granted to the secondary device.

While the embodiments described above may make reference to specific hardware and software components, those skilled in the art will appreciate that different combinations of hardware and/or software components may also be used and that particular operations described as being implemented in hardware might also be implemented in software or vice versa. Further, while Bluetooth and Bluetooth LE are referred to as examples of communication channels, the present invention is not limited to specific communication channels or technologies. Communication between various devices can be provided using other short-range technologies such as near-field communications, or longer-range technologies such as Wi-Fi, cellular data networks, or the like.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

Thus, although the invention has been described with respect to specific embodiments, it will be appreciated that the invention is intended to cover all modifications and equivalents within the scope of the following claims.

What is claimed is:

1. A method for accessing a secured object, the method comprising:
    establishing, by a first portable device having a touch screen display, a first connection between the first portable device and the secured object;
    receiving, by the first portable device, an access credential from the secured object via the first connection, wherein the access credential received from the secured object enables the first portable device to access the secured object;
    establishing, by the first portable device, a second connection between the first portable device and a second portable device that is different from the first portable device based on a user input received at the touch screen display; and
    transmitting, by the first portable device, an additional access credential to the second portable device via the established second connection, wherein the additional access credential is used by the second portable device to enable access to the secured object by a direct connection.

2. The method defined in claim 1 wherein the direct connection is a Bluetooth connection.

3. The method defined in claim 1, further comprising:
    transmitting, by the first portable device, a usage parameter to the second portable device, wherein the usage parameter defines an access limitation associated with the secured object for the second portable device.

4. The method of claim 1 further comprising:
    transmitting, by the first portable device, a usage parameter to the second portable device, wherein the usage parameter defines an access limitation; and
    digitally signing, by the first portable device, the usage parameter using a cryptographic key prior to transmitting the usage parameter to the second portable device.

5. The method of claim 4 wherein the access limitation comprises:
    limiting accessible operations of the secured object to fewer than all the operations that are accessible using the first portable device.

6. The method of claim 1, wherein upon transmitting the additional access credential, the first portable device disallows a user from using the first portable device to enable access to the secured object.

7. The method defined in claim 1, wherein the secured object is selected from the group of objects consisting of: a vehicle, a safe, a vault, a building, workout equipment, and a room.

8. A method for accessing a secured system, the method comprising:
    receiving, by a secondary portable device, an access credential from a primary portable device;
    establishing, by the secondary portable device, a direct connection between the secondary portable device and the secured system; and
    transmitting, by the secondary portable device, the access credential to the secured system via the direct connection, wherein access to the secured system is enabled based on the access credential and enabling access to the secured system executes one or more operations of the secured system selected from the group of operations consisting of:
    automatically adjusting an adjustable seat of the secured system to a predetermined position;
    automatically adjusting one or more settings of an entertainment system of the secured system; and
    activating a location reporting function of the secured system.

9. The method defined in claim 8 further comprising:
    establishing, by the secondary portable device, an additional direct connection between the secondary portable device and the primary portable device, wherein the access credential is received via the additional direct connection.

10. The method defined in claim 9 wherein the direct connection and the additional direct connection are Bluetooth connections.

11. The method defined in claim 8 wherein the access credential is received by the secondary portable device from the primary portable device in an e-mail message.

12. The method defined in claim 8, further comprising:
    receiving, by the secondary portable device, a usage parameter from the primary portable device, wherein the usage parameter defines and access limitation for accessing the secured system by the secondary portable device.

13. A method for accessing a secured object, the method comprising:

establishing, by the secured object, a connection between the secured object and a primary portable device;

encrypting, by the secured object, a first access credential;

transmitting, by the secured object, the encrypted first access credential to the primary portable device over a connection;

establishing, by the secured object, a direct connection between the secured object and a secondary portable device;

receiving, by the secured object, a second access credential from the secondary portable device over the direct connection; and enabling, by the secured object, access to the secured object based at least in part on the second access credential.

14. The method defined in claim 13, further comprising:

determining, by the secured object, authenticity of the second access credential; and enabling, by the secured object, the access to the secured object based at least in part on the authenticity of the second access credential.

15. The method defined in claim 14, wherein determining the authenticity of the second access credential comprises identifying whether the second access credential was obtained by the secondary portable device from the primary portable device.

16. The method defined in claim 13, wherein the direct connection is a Bluetooth or Bluetooth LE connection.

17. The method defined in claim 13, wherein the connection between the secured object and the primary portable device is a Bluetooth or Bluetooth LE connection.

18. The method defined in claim 13 further comprising:

receiving a usage parameter from the secondary portable device, wherein the usage parameter defines an access limitation;

receiving an instruction to perform an operation from the secondary portable device;

determining whether to perform the operation based on whether the usage parameter indicates that the operation should be allowed; and performing the operation in the event that the usage parameter indicates that the operation should be allowed.

19. The method defined in claim 13, wherein the direct connection is a short-range, point-to-point wireless connection.

20. The method defined in claim 1, further comprising:

retrieving, by the first portable device, location information from the second portable device that was gathered by the second portable device while the second portable device was enabled access to the secured object using the additional access credential.

* * * * *